UNITED STATES PATENT OFFICE.

JOHN HEATH WOOD, OF CHICAGO, ILLINOIS, ASSIGNOR TO OSRO CHEMICAL COMPANY, A CORPORATION OF ILLINOIS.

PASTE CALCIMINE.

1,308,136.      Specification of Letters Patent.      Patented July 1, 1919.

No Drawing.      Application filed October 25, 1916. Serial No. 127,533.

*To all whom it may concern:*

Be it known that I, JOHN HEATH WOOD, a citizen of the United States, and a resident of the city of Chicago, in the county of Cook and State of Illinois, have invented a certain new and useful Paste Calcimine; and I do hereby declare that the following is a full, clear, and exact description of the same.

This invention relates to an improved calcimine both in white and in various color tints, adapted for use on walls and ceilings and for other purposes where decorative effects are desired.

It is an object of this invention to provide a calcimine in paste form which may be made ready for use by the addition of water until the proper consistency is obtained and of different color tints by the addition of various color pigments.

It is furthermore an object of this invention to provide a calcimine which does not change, decompose or ferment in storage or after application upon a surface; which remains perfectly soft when kept in closed containers or covered with water; which is antiseptic and acts as a disinfectant to the surface upon which applied, forming a sanitary coating on which reproduction of bacteria and growth of fungi cannot proceed; which works smooth under the brush and flows perfectly, and, when applied in the proper consistency, forms a coating which will not peel, crack nor scale off the surface to which it is applied.

It is finally an object of this invention to provide a paste calcimine easy and cheap to manufacture, readily prepared for use and easily applied, and, when no further needed, easily removed by washing with water.

The paste calcimine consists of a mixture of whiting, silica, magnesium silicate, aluminum silicate, or any inert pigment together with a specially prepared vegetable glue and water. In the preparation of this calcimine, three hundred fifty (350) pounds of whiting or inert pigment, ninety four (94) pounds of vegetable glue, and eleven (11) gallons of water are thoroughly incorporated in a specially constructed mixer. Different colored pigments may be added to secure the tints desired.

Any glue or adhesive may be used, but preferably a vegetable glue such as disclosed in the application for patent of James H. Paiton, for "Glue and process of making same", filed August 17th, 1916, Serial Number 115,467, and which may be made in either one of the following mixtures:

Mixture No. 1.

Eighteen pounds of flour, and nine gallons of water are put into a mixer and thoroughly mixed with one another, after which two and six-tenths pints of caustic soda solution are added; the soda solution has a specific gravity of 1.4, and contains thirty-seven per cent. of caustic soda. The reaction of the constituents of the mixture is allowed to proceed for approximately two hours, while continually stirred in the mixer. The excess of caustic soda is then neutralized to the extent of ninety per cent. by the addition of sulfuric acid, one pint of acid to four pints of water, and all the ingredients are then intimately mixed together, and this constitutes a glue for calcimine.

Mixture No. 2.

Nine pounds of starch (any kind of starch, preferably corn starch) are mixed with four and one-half gallons of water; one and one-eighth pints of caustic soda solution of 1.9 specific gravity and two and one-fourth gallons more water are then added to the starch solution and all stirred until thoroughly mixed and allowed to stand approximately for twelve hours. The mixture is then agitated and six pints of sulfuric acid added, the strength of which is one pint of acid to four pints of water. After this is thoroughly intermixed, four and one-half pints of resin size, mixed in two and one-fourth gallons of water, are added, and the whole stirred until thoroughly incorporated.

The resin size is obtained by dissolving five pounds of resin and two and one-half pounds of borax and two pints of caustic soda solution of 1.4 specific gravity, in ten and one-half pints of water. This is boiled until a solution is obtained, or, in other words, until the constituents are dissolved in the water.

The paste calcimine prepared in the above manner has a semi-paste consistency, and can be marketed in metal or wood packages and transferred without injurious effects or changes in the calcimine taking place.

It is obvious that the proportion of the different substances may be varied, but applicant purposes claiming broadly the calcimine composition consisting of pulverized whiting or calcium carbonate, the specially prepared vegetable glue described, and water.

I claim as my invention:

1. A paste calcimine comprising calcium carbonate, water, a glue comprising the reaction products of starch, water, sodium hydroxid and acid to neutralize the excess amount of sodium hydroxid, all mixed in substantially the proportions described.

2. A paste calcimine comprising a mixture in substantially the proportions described, of whiting, a color pigment, water, and a glue embracing the reaction products of starch, water, sodium hydroxid, resin size, and acid to neutralize the excess amount of sodium hydroxid.

3. A paste calcimine containing three hundred fifty (350) pounds of whiting, eleven (11) gallons of water, and ninety four (94) pounds of vegetable glue comprising the reaction products of starch, water, caustic soda, resin size, and acid.

4. A calcimine consisting of calcium carbonate and a glue comprising the reaction products of starch, water, NaOH, resin size, and sufficient acid to neutralize the excess amount of NaOH.

5. A paste calcimine consisting of three hundred fifty (350) pounds of an inert pigment, ninety four (94) pounds of a glue comprising the reaction products of starch, water, sodium hydroxid and acid to neutralize the excess amount of sodium hydroxid, and eleven (11) gallons of water.

In testimony whereof I have hereunto subscribed my name in the presence of two subscribing witnesses.

JOHN HEATH WOOD.

Witnesses:
EARL M. HARDINE,
CHARLES W. HILLS, Jr.

Copies of this patent may be obtained for five cents each, by addressing the "Commissioner of Patents, Washington, D. C."